(No Model.) 3 Sheets—Sheet 1.

F. WILKING & H. MÜLLER.
DISTRIBUTION AND REGULATION OF ELECTRIC CURRENTS.

No. 437,272. Patented Sept. 30, 1890.

Witnesses.

Inventors.
F. Wilking,
and H. Müller.
by Herbert W. T. Jenner.
Attorney

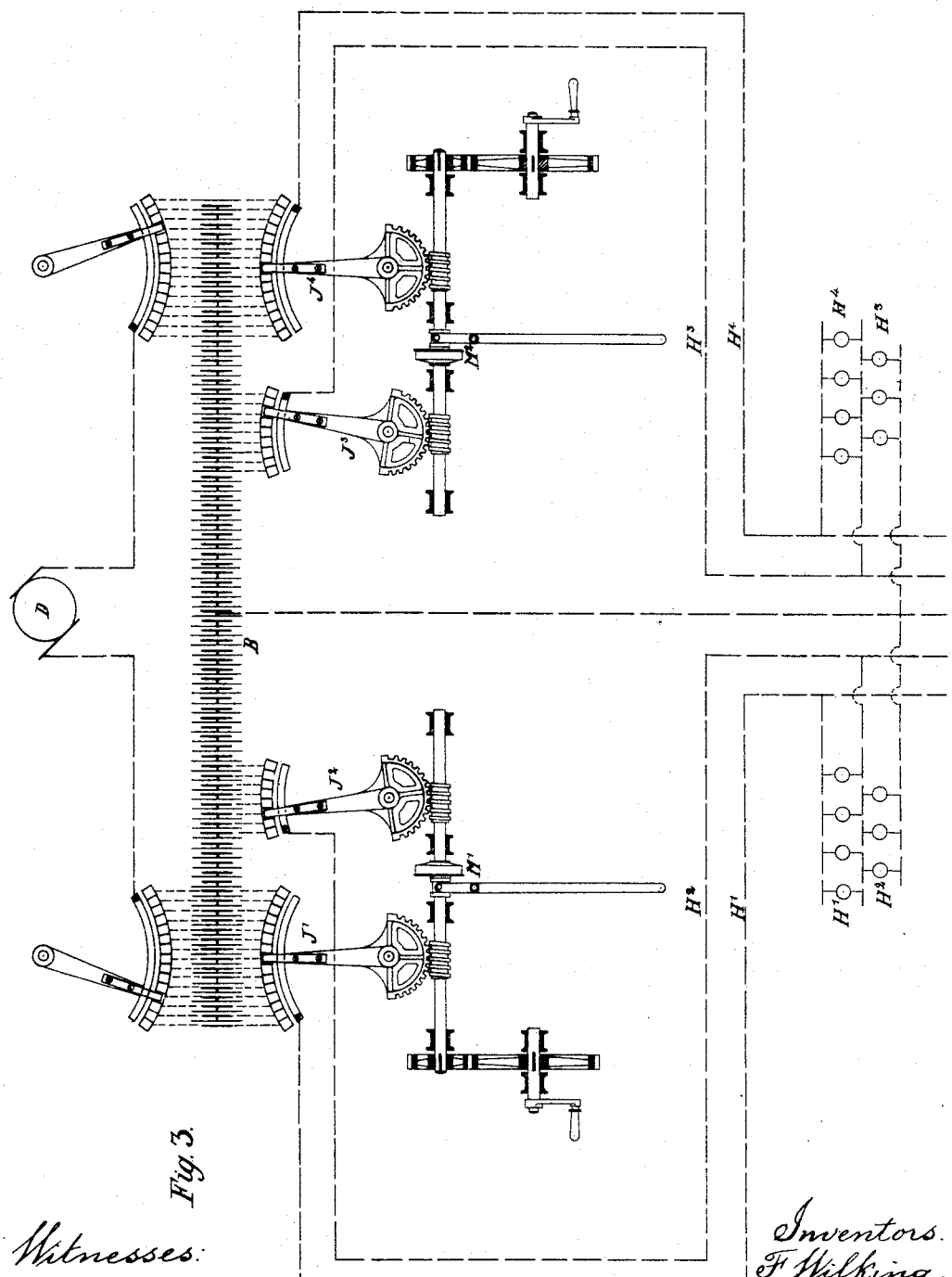

(No Model.) 3 Sheets—Sheet 3.
F. WILKING & H. MÜLLER.
DISTRIBUTION AND REGULATION OF ELECTRIC CURRENTS.
No. 437,272. Patented Sept. 30, 1890.
Fig. 4.
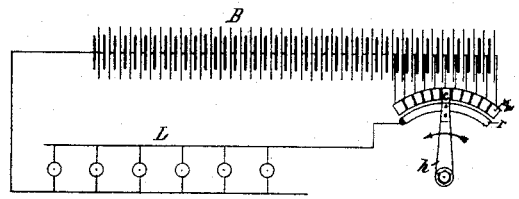
Fig. 5.
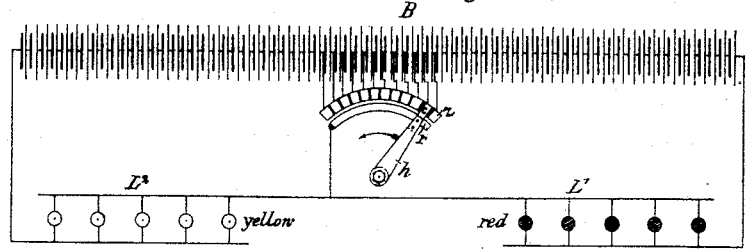
Fig. 6. Fig. 6ª.
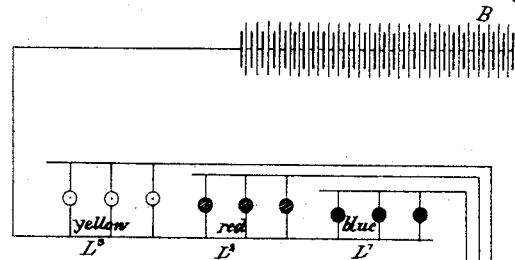 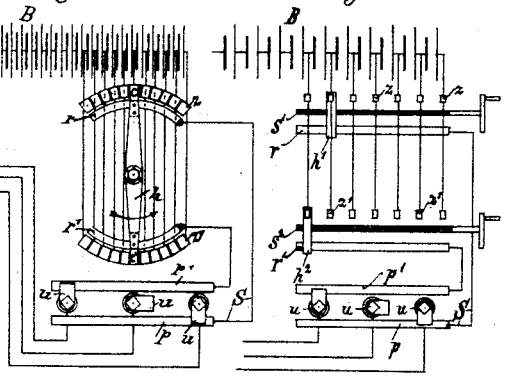
Fig. 7.
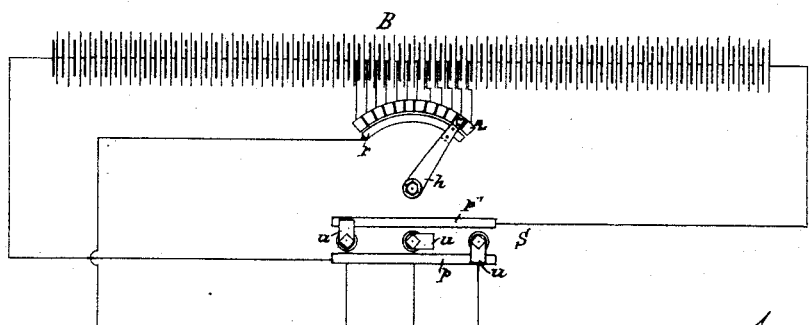
Witnesses:
Alvin Bell.
F. A. Hopkins.
Inventors.
F. Wilking
and H. Müller
by Herbert W. T. Jenner.
Attorney.

UNITED STATES PATENT OFFICE.

FRANZ WILKING, OF BERLIN, AND HERMANN MÜLLER, OF NUREMBERG, GERMANY.

DISTRIBUTION AND REGULATION OF ELECTRIC CURRENTS.

SPECIFICATION forming part of Letters Patent No. 437,272, dated September 30, 1890.

Application filed March 28, 1890. Serial No. 345,697. (No model.) Patented in England November 4, 1889, No. 17,521; in Italy November 4, 1889, XXIII, 26,395, LII, 34, and in Belgium November 4, 1889, No. 88,281.

*To all whom it may concern:*

Be it known that we, FRANZ WILKING, a subject of the Grand Duke of Oldenburg, residing at Berlin, in the Kingdom of Prussia and German Empire, and HERMANN MÜLLER, a citizen of the Swiss Republic, residing at Nuremberg, in the Kingdom of Bavaria and German Empire, have invented certain new and useful Improvements in the Distribution and Regulation of Electric Currents; and we do hereby declare the following to be a full, clear, and exact description of the invention, such as will enable others skilled in the art to which it appertains to make and use the same.

Letters Patent have been granted for this invention as follows: In Great Britain, No. 17,521, November 4, 1889; in Italy, Vol. 23, No. 26,395 and Vol. 52, No. 34, November 4, 1889, and in Belgium, No. 88,281, November 4, 1889.

This invention relates to the distribution and regulation of electric currents; and it consists in improvements which have for their object, first, in a system of distribution designed for a uniform tension of consumption and receiving electric energy from two or more feeders ($a$) to regulate the terminal tensions of all the feeders with variable consumption of current, and ($b$) to allow of unequal loss of tension in the several feeders with the maximum consumption of current; second, at places, where variation in the intensity of the light is required, to allow of the alteration of the tension of the lamps according to the brightness desired.

Both the above-mentioned objects are by the hereinafter-described improvements effected without the usual resistances, which consume uselessly a portion of the electrical energy and convert the same into heat. The supply leads or feeders, particularly where the areas of consumption are extensive, are of very unequal lengths and cause in consequence various losses of tension when each lead has its profitable cross-section, as defined in Thomson's formula.

Figure 2:
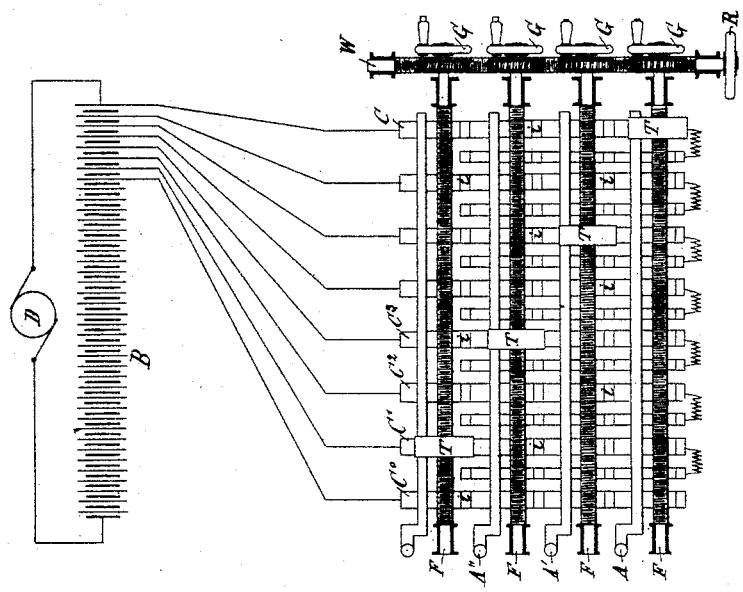
Figure 1:
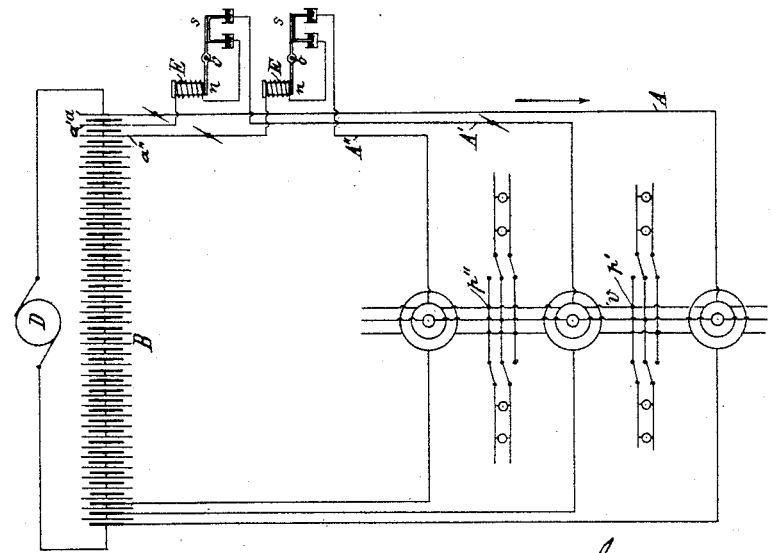

In the drawings, Figure 1 is a diagram showing the application of this invention in connection with three feeders, two of which are provided with automatic cut-outs. Fig. 2 is a diagram showing the means for varying the connections with cells of different potential. Fig. 3 is a diagram showing the application of the invention to a five-wire system. Fig. 4 is a diagram showing the application of a cell-switch device for varying the intensity of the light. Fig. 5 shows a similar switch applied to regulate two sets of lamps. Figs. 6 and 6ª are diagrams of the devices used for regulating three sets of lamps, and Fig. 7 shows a modification of the same.

In order to effect this, (with uniform tension of the system,) we lay the feeders at points of different potential, and employ for this purpose, besides the current-generating dynamo D, a storage-battery B, as illustrated in Fig. 1 of the accompanying drawings. Since the tension of one cell amounts to about two volts, it is possible in this manner to cause the loss of tension of the positive or negative feeder to take place in steps of two, four, six, &c., volts each, or the whole loss of tension in the positive and negative feeder together to take place in steps of approximately four, eight, twelve, &c., volts. At first sight it would appear as if the cell $a$, Fig. 1, were short-circuited through the two positive feeders A and A', and the main lead $v$; but this is not the case so long as consumption takes place in the system—that is to say, that current is conveyed in the direction of the arrow through both feeders A and A'. In order to control this, each feeder is provided with a device showing the direction of the current, in order that in the case of a wrong direction of the current—in A', for instance—this lead may either be cut out or connected to the point of connection of A.

In order that short-circuiting of the cells through two feeders of the same polarity and the corresponding main lead (caused by inattention on the part of an attendant) may be instantaneously stopped, we provide the feeders with cutting-out devices, which operate in an automatic manner when the current takes a wrong direction.

A' and A'' are the feeders leading from two adjacent cells $a'$ and $a''$ of the storage-battery to the points $p'$ and $p''$, respectively.

The whole system being in operation and the dynamo being at work, when the difference of potential between the points forming the terminals of the lamp groups is less than the difference of potential at the terminals of the two cells $a'$ and $a''$ the currents in the feeders A' and A'' will flow in the same direction; but when the resistance of the groups of lamps is changed, so that the difference of potential between the said points forming the terminals of the lamp groups is greater than the difference of potential at the terminals of the said two cells, the current in the feeder A'' will flow in the reverse direction. This reverse current in A'' must then be interrupted, which may be effected by the automatic switch, which will now be described, or the feeder A' may be separated from the cell $a'$ and connected to the cell $a''$.

In Fig. 1 the feeders A' and A'' are shown provided with cutting-out devices, each consisting of an electro-magnet E, included in A' and A''. A polarized armature $n\ s$, pivoted at $v$, which is attracted when the current is in the right direction, and by means of two contacts dipping in mercury-cups, maintains the closure of the circuit, but is repelled when the current is in the wrong direction and causes the breaking of the circuit. Now, both the tension of the cells (according to the state of charging and discharging) and the loss of tension in the feeders (according to the consumption of current in the system) are variable. We therefore arrange the connecting-points of the feeders also in a variable manner and so that both the connection of each feeder separately and the connections of all the feeders together are movable. (See Fig. 2.) In this figure $C^0$ $C'$ $C^2$, &c., are leads—for instance, copper rods—which come from successive cells and have each a different potential. These copper rods are provided with projections $i$, with which the slides T of the feeder A A' are brought into contact. The slides T are in the form of nuts screwing on the threaded spindles F. When these spindles are rotated by the hand-wheels G, the contact-slides T move to the right or to the left, according to the direction of rotation, and thus effect a corresponding alteration in the tension in the respective feeders. All the small hand-wheels G are detachably coupled with the common shaft W, so that each spindle F may be rotated separately, and all the spindles rotating together by means of the wheel R on shaft W.

The arrangement hereinbefore described is particularly advantageous for the three-wire system, as the neutral leads can be connected to one and the same point, while the two systems of positive and negative feeders are connected symmetrically to points of different potentials, Fig. 1, and are each provided with a separate regulating device, according to Fig. 2; but several feeders of the same loss of tension can also be regulated together. In the case of unequal consumption of current in the two halves of the three-wire system, the neutral lead also conveys current in one or the other direction and causes thereby a loss of tension, which decreases the tension of one half and simultaneously increases the tension of the other half of consumption-circuits. Both could be compensated in the easiest manner by shifting the neutral lead-connection, as the cell passing out of the last half would pass into the first half; but this need not be done under ordinary circumstances, (in view of the saving of one regulating device,) as the influence of the loss of tension in the neutral lead can also be removed by shifting the positive and negative feeders.

In the multiple-wire systems, on the contrary, the regulation of the two outer leads does not suffice. We therefore employ for the five-wire system, for example, the arrangement illustrated in Fig. 3. The four multiple-arc circuits H' to $H^4$, connected in series, are provided with as many cell-switch devices, T' to $T^4$, in such a combination that the regulation of the one circuit will not influence the other. The cell-switch devices are therefore connected with the four outer leads, while the neutral lead is connected with the middle of the series of cells. The cell-switch device T' is detachably coupled with $T^2$ by means of a clutch device M' of any suitable construction. The cell-switch device $T^4$ is similarly connected by a similar device $M^2$ with $T^3$. This clutch M' ($M^2$) is thrown out of gear as soon as the multiple-arc circuit H' ($H^4$) is to be regulated alone; but it is thrown in gear as soon as $H^2$ ($H^3$) is to be regulated alone. By operating the cell-switch device $T^2$ ($T^3$) in one or the other sense T' ($T^4$) is caused to follow in the same sense. The number of cells for the circuit H' ($H^4$) remains, therefore, completely unaltered for the regulation of the circuit $H^2$ ($H^3$.)

For the four-wire system we arrange corresponding to the three circuits connected in series three cell-switch devices, for example, for the first, third, and fourth lead, the two latter coupled detachably in the manner above described.

In those places of consumption which require various alterations of the tension of the lamps (such as on the stage in theaters) for varying the intensity of the light we employ the following arrangement: To the main lead of the stage is connected an accumulator-battery B, Fig. 4, consisting of one or more parallel series of cells. Each group of lamps L, the brightness of which is to be regulated separately, is provided with a cell-switch device consisting of a number of fixed contacts $z$, a fixed sliding piece $r$, connected to the main lead of the group of lamps, and a movable contact $c$, which is attached to the pivoted switch-lever $h$ and makes connection between the cell-contacts and the sliding piece (or main lead.) The position of the lever $h$ determines the connection of the group of lamps with a greater or less number of cells, so that the tension and consequently the brightness of the lamps may be varied in a very simple manner. The cell-switch devices for several groups of lamps can be combined in a suitable manner by using cell-contacts common to all, as indicated in Fig. 2, for the supply-leads of the distribution system.

For the purpose of mingling two colors— say red and yellow—and also of changing from one color to the other, we employ the arrangement illustrated in Fig. 5. The positive leads of the red and yellow lamps L' and L² are connected to the terminals of a series of cells, and a cell-switch device is provided for the middle cells which are connected with the common negative lead of the two groups of lamps. As long as the switch-lever is in its middle position the brightness in both the red and the yellow lamps is equal; but when the switch-lever is rotated to the left in the direction of the arrow the tension and the brightness of the red lamp L' are increased and that of the yellow ones L' are reduced at the same time. When the lever is in its extreme left-hand position, the first group of lamps glows with normal brightness, while the other group glows with but a weak light, so that the red predominates almost to the exclusion of the yellow. When the lever is rotated toward the right, this color changes gradually to yellow.

Fig. 6 shows a modification of this arrangement, wherein the two groups of lamps are branched off parallel with a series of cells by means of double-cell-switch devices. The negative lead may be common to both. The double-cell-switch device is provided for the two groups with two series of cell-contacts $z$ $z'$, placed in reverse order. Therefore when the switch-lever is rotated the number of cells of the one group increases, while the other diminishes at the same time, as shown in Fig. 5. In order to effect the mingling of colors and the change from one color to the other, in every combination of the three-lamp system with lamp-globes L' L² L³ (colored blue, red, yellow, for instance) and with a common negative lead for all three groups of lamps we employ a triple switch S, as shown in Figs. 6 and 6ª. This switch consists of two contact-bars $p$ $p'$, connected with the sliding pieces $r$ $r'$ of the double-cell-switch device, and of three switch-contacts $u$, connected with the main leads of the blue, red, and yellow lamps, which contacts can be separately connected with $p$ or $p'$, or may be disconnected therefrom, as required. In the position shown in Figs. 6 and 6ª the blue lamps are connected with $r$, the yellow ones with $r'$, and both groups of lamps glow with medium brightness. When the switch-lever $h$ of Fig. 6 is rotated in the direction of the arrow, or the sliding pieces $h'$ $h^2$ in Fig. 6ª are sliding in opposite directions on the spindles $s'$ $s^2$, the number of cells and consequently the brightness of the yellow lamps are increased, that of the blue lamps being at same time diminished.

The employment of the triple switch S in the arrangement shown in Fig. 5 effects the regulation of the three-lamp system according to Fig. 7, which will be readily understood from the preceding without further explanation.

What we claim is—

1. The combination, with a storage-battery and feeders leading from different cells of said battery and connected to the distributing-wires at various points, substantially as set forth, of cut-out devices inserted in said feeders and adapted to break the circuit when the direction of the current is reversed, substantially as described and shown.

2. The combination, with a storage-battery and feeders leading from different cells of said battery and connected to the distributing-wires at different points, substantially as set forth, of switch devices inserted between said feeders and the cells of the battery, whereby each feeder may be disconnected from the cell to which it normally belongs and connected to any one of the adjacent cells, substantially as described.

3. The combination, with a storage-battery and feeders leading from different cells of said battery and connected to the distributing-wires at different points, substantially as set forth, of switch devices inserted between said feeders and the cells of the battery, whereby each feeder may be disconnected from the cell to which it normally belongs and connected to any one of the adjacent cells, and a coupling device connecting the said switches and enabling them to be operated simultaneously, substantially as described.

4. The combination, with a storage-battery and feeders leading from different sections of the cells of said battery and connected to the distributing-wires at different points, substantially as set forth, of separate switch devices permanently connected to the feeders and adapted to be moved to connect them with the various cells of the sections of the battery to which they respectively belong, substantially as described.

5. The combination, with a storage-battery and one or more main wires leading therefrom to lamps, of switch devices inserted in the feeders and adapted to connect them with various cells in the battery to vary the tension of the current and the brightness of the lamps, substantially as set forth.

6. The combination, with a storage-battery and two separate main wires connected to two groups of lamps, of a third main wire common to both groups of lamps, and switch devices adapted to connect the said third main wire to different cells of the battery to increase the tension of the current to one group of lamps and increase their brilliancy and to simultaneously lower the tension of the current to the other set of lamps to decrease their brilliancy, substantially as set forth.

7. The combination, with a storage-battery and three separate main wires connected to three groups of lamps, of a fourth main wire common to the three groups of lamps, and a triple switch device adapted to connect any one or combination of the three said groups of lamps with the battery through the said fourth main wire, substantially as and for the purpose set forth.

8. The combination, with a storage-battery and three separate main wires connected to three groups of lamps, of a fourth main wire common to the three said groups of lamps, a triple switch device adapted to connect any one or combination of the three said groups of lamps with the said fourth main wire, separate leads from various cells of the said storage-battery, and switch devices adapted to connect the said fourth main wire with either of the said leads, substantially as and for the purpose set forth.

In testimony whereof we have signed our names to this specification in the presence of two subscribing witnesses.

FRANZ WILKING.
HERMANN MÜLLER.

Witnesses for the signature of Franz Wilking:
MARC M. ROTTEN,
OSCAR SCHMIDT.

Witnesses for the signature of Hermann Müller:
SIGMUND DIETRICH,
WILLIAM R. MATTHES.